(12) United States Patent
Kulkarni et al.

(10) Patent No.: US 7,780,749 B2
(45) Date of Patent: Aug. 24, 2010

(54) UNMIXED FUEL PROCESSORS AND METHODS FOR USING THE SAME

(75) Inventors: Parag Prakash Kulkarni, Tustin, CA (US); Zhe Cui, Irvine, CA (US)

(73) Assignee: General Electric Company, Niskayuna, NY (US)

( * ) Notice: Subject to any disclaimer, the term of this patent is extended or adjusted under 35 U.S.C. 154(b) by 925 days.

(21) Appl. No.: 11/609,124

(22) Filed: Dec. 11, 2006

(65) Prior Publication Data
US 2008/0134579 A1 Jun. 12, 2008

(51) Int. Cl.
*B01J 7/00* (2006.01)
*B01J 8/18* (2006.01)
*C10J 3/46* (2006.01)

(52) U.S. Cl. .............. 48/61; 48/77; 48/111; 48/95; 48/113; 48/78; 48/197 R; 48/127.9; 48/127.1; 48/198.5; 48/198.7; 422/139; 422/141; 423/215.5; 423/210; 423/219; 423/217

(58) Field of Classification Search ............. 422/139; 48/127.9, 61, 202, 210, 206, 197 R, 201, 48/213; 423/651; 208/153, 163
See application file for complete search history.

(56) References Cited

U.S. PATENT DOCUMENTS 4,026,679 A * 5/1977 Collin ................. 48/73
4,217,201 A * 8/1980 Chervenak ............ 208/414
4,309,198 A * 1/1982 Moss .................. 48/197 R
4,618,451 A * 10/1986 Gent .................... 252/373
5,339,754 A   8/1994 Lyon (Continued)

OTHER PUBLICATIONS

Richard K. Lyon et al.. "Pollution Free Combustion of Coal and Other Fossil Fuels", Paper 98F-36, presented at the Oct. 1998 meeting of the Western States Section of the Combustion Institute, Oct. 26-27, 1998, 12 pages.

(Continued)

*Primary Examiner*—Alexa D. Neckel
*Assistant Examiner*—Kaity V. Handal
(74) *Attorney, Agent, or Firm*—Ann M. Agosti

(57) ABSTRACT

Disclosed herein are unmixed fuel processors and methods for using the same. In one embodiment, an unmixed fuel processor comprises: an oxidation reactor comprising an oxidation portion and a gasifier, a $CO_2$ acceptor reactor, and a regeneration reactor. The oxidation portion comprises an air inlet, effluent outlet, and an oxygen transfer material. The gasifier comprises a solid hydrocarbon fuel inlet, a solids outlet, and a syngas outlet. The $CO_2$ acceptor reactor comprises a water inlet, a hydrogen outlet, and a $CO_2$ sorbent, and is configured to receive syngas from the gasifier. The regeneration reactor comprises a water inlet and a $CO_2$ stream outlet. The regeneration reactor is configured to receive spent $CO_2$ adsorption material from the gasification reactor and to return regenerated $CO_2$ adsorption material to the gasification reactor, and configured to receive oxidized oxygen transfer material from the oxidation reactor and to return reduced oxygen transfer material to the oxidation reactor.

16 Claims, 3 Drawing Sheets

U.S. PATENT DOCUMENTS

| | | | |
|---|---|---|---|
| 5,509,362 | A | 4/1996 | Lyon |
| 5,827,496 | A | 10/1998 | Lyon |
| 6,007,699 | A | 12/1999 | Cole |
| 6,494,153 | B1 | 12/2002 | Lyon |
| 6,572,761 | B2 | 6/2003 | Lyon |
| 6,669,917 | B2 | 12/2003 | Lyon |
| 6,911,057 | B2 | 6/2005 | Lyon |
| 2003/0029088 | A1 | 2/2003 | Lyon |
| 2003/0035770 | A1 | 2/2003 | Cole |
| 2004/0060237 | A1 | 4/2004 | Cole |
| 2005/0112056 | A1* | 5/2005 | Hampden-Smith et al. .. 423/651 |

OTHER PUBLICATIONS

Parag P. Kulkarni et al., "Advanced Unmixed Combustion/Gasification: Potential Long Term Technology for Production of H2 and Electricity From Coal with CO2 Capture", Paper Submitted for presentation at the 23rd International Pittsburg Coal Conference, 2006; 2 pages.

Parag P. Kulkarni et al., U.S. Appl. No. 11/609,109, filed Dec. 11, 2006, "Systems and Methods Using an Unmixed Fuel Processor", Available in the Image File Wrapper (IFW).

* cited by examiner

UNMIXED FUEL PROCESSORS AND METHODS FOR USING THE SAME

STATEMENT REGARDING FEDERALLY SPONSORED RESEARCH & DEVELOPMENT

This invention was made with Government support under contract number DOE NETL DE-FC26-05NT40974 awarded by the U.S. Department of Energy. The Government may have certain rights in the invention.

BACKGROUND

This application relates generally to unmixed fuel processors and methods for using the same.

With its abundant domestic supply, coal is one of the most secure, reliable, and affordable energy supplies for the U.S. today, gasification of coal to produce electricity is being commercially introduced as Integrated Gasification Combined Cycle (IGCC) power plants. However, one of the major problems in modern industrial society is air pollution by conventional combustion systems based on biomass and fossil fuels. The oldest recognized air pollution problem is the emission of smoke. In modern boilers and furnaces, smoke emissions could be eliminated or at least greatly reduced by the use of Over Fire Air ("OFA") technology. Other types of air pollution produced by combustion include particulate emissions such as fine particles of ash from pulverized coal firing, oxides of sulfur ($SO_2$ and $SO_3$), carbon monoxide emissions, volatile hydrocarbon emissions and the release of two oxides of nitrogen, NO and $NO_2$. More recently, the problem of global warming due to greenhouse gas emissions of $CO_2$ from power plants and other combustion systems have become a matter of serious environmental concern.

Another major technological problem concerns the use of coal as a fuel for powering gas turbines. Gas turbines are the lowest capital cost systems available for generating electrical power. Since the thermodynamic efficiency of gas turbines increases with increasing turbine inlet temperature, efforts to improve turbine efficiency generally involve increasing the turbine inlet temperature to higher levels. As a result, turbine blades and other components have been engineered to tolerate increasing high inlet temperatures. It is well known that the hot gases produced by coal firing contain fly ash (which is erosive to turbine blades). In the presence of this erosive fly ash the maximum service temperature at which turbine blades can operate is less than it would be otherwise. This limitation significantly decreases the overall process efficiency and lowers the competitiveness of coal as a gas turbine fuel. These and other disadvantages have also prevented lower cost (and abundant) coal from being considered an attractive gas turbine fuel. If a process were developed whereby coal could be burned in a manner that produced hot gases that were not erosive or corrosive, the need for temperature reduction would be eliminated and coal would become a much more economically viable gas turbine fuel.

U.S. Pat. Nos. 5,339,754, 5,509,362, and 5,827,496, disclose a method of burning fuels using a catalyst that is readily reduced when in an oxidized state and readily oxidized when in a reduced state, with the fuel and air being alternatively contacted with the catalyst. The fuel reduces the catalyst and is oxidized to carbon dioxide ($CO_2$) and water vapor. In turn, the air oxidizes the catalyst and becomes depleted of oxygen. Combustion can thereby be effected without the need of mixing the fuel and air prior to, or during, the combustion process. If means are provided whereby the $CO_2$ and water vapor and the oxygen depleted air can be directed in different directions as they leave the combustion process, the mixing of fuel and air can be completely avoided. This particular method of combustion has become known in the art as "unmixed combustion".

One of the major challenges with unmixed combustion types of technologies is the handling of ash in the solid carbonaceous fuel. The alkali metal oxides in the ash can melt under the operating conditions and can create agglomerates with the other solids present in the reactor. This may result into huge loss of reliability/availability of such type of technologies. Hence, there continues to be a need for unmixed combustion technologies that address the agglomeration issue.

BRIEF DESCRIPTION

Disclosed herein are embodiments of systems and methods for producing electricity using unmixed fuel processors.

In one embodiment, an unmixed fuel processor comprises: an oxidation reactor comprising an oxidation portion and a gasifier, a $CO_2$ acceptor reactor, and a regeneration reactor. The oxidation portion comprises an air inlet, effluent outlet, and an oxygen transfer material. The gasifier comprises a solid hydrocarbon fuel inlet, a solids outlet, and a syngas outlet. The $CO_2$ acceptor reactor comprises a water inlet, a hydrogen outlet, and a $CO_2$ sorbent, and is configured to receive syngas from the gasifier. The regeneration reactor comprises a water inlet and a $CO_2$ stream outlet. The regeneration reactor is configured to receive spent $CO_2$ adsorption material from the gasification reactor and to return regenerated $CO_2$ adsorption material to the gasification reactor, and configured to receive oxidized oxygen transfer material from the oxidation reactor and to return reduced oxygen transfer material to the oxidation reactor.

In one embodiment, a method for operating an unmixed fuel processor, comprises: introducing a solid hydrocarbon fuel to a gasifier of an oxidation reactor, oxidizing an oxygen transfer material in the oxidation portion and forming an oxygen depleted stream, gasifying the solid hydrocarbon fuel, reacting the solid hydrocarbon fuel to form syngas, removing solids from the syngas, introducing the syngas and water to a $CO_2$ acceptor reactor, adsorbing the $CO_2$ with a $CO_2$ sorbent to produce a spent $CO_2$ sorbent and form a $H_2$ stream, and regenerating the spent $CO_2$ sorbent and reducing the oxidized oxygen transfer material in a regeneration reactor and forming a $CO_2$ stream. The oxidation portion comprises an oxygen transfer material. The gasifier comprises a solids accumulation area and a solids outlet.

The above described and other features are exemplified by the following figures and detailed description.

BRIEF DESCRIPTION OF THE DRAWINGS

Refer now to the figures, which are exemplary, not limiting, and wherein like numbers are numbered alike.

DETAILED DESCRIPTION

Unmixed fuel processor (UFP) technology offers the potential for reduced cost, increased process efficiency, and/or lower emissions relative to other gasification and combustion systems. However, these processors face agglomeration issues. Disclosed herein are UFP systems and methods that separate solid hydrocarbon fuel gasification from the solids used in the chemical looping or unmixed combustion type of technologies. By separation of the gasification and the solids used in the unmixed fuel processor, it is possible to reduce and/or eliminate the agglomeration issue while receiving the numerous advantages of the UFP technology. In these systems, multiple (e.g., three) fluidized beds are continuously circulated such that spent $CO_2$ sorbent and oxidized oxygen transfer material are regenerated in a regeneration reactor and are returned to a $CO_2$ acceptor reactor and an oxidation reactor. Since the oxidation reactor comprises the gasification vessel for the solid hydrocarbon fuel gasification, and a portion of the gasification vessel is maintained cool (e.g., at a temperature of less than or equal to about 700° C.), solids are effectively removed from the system.

Figure 1:
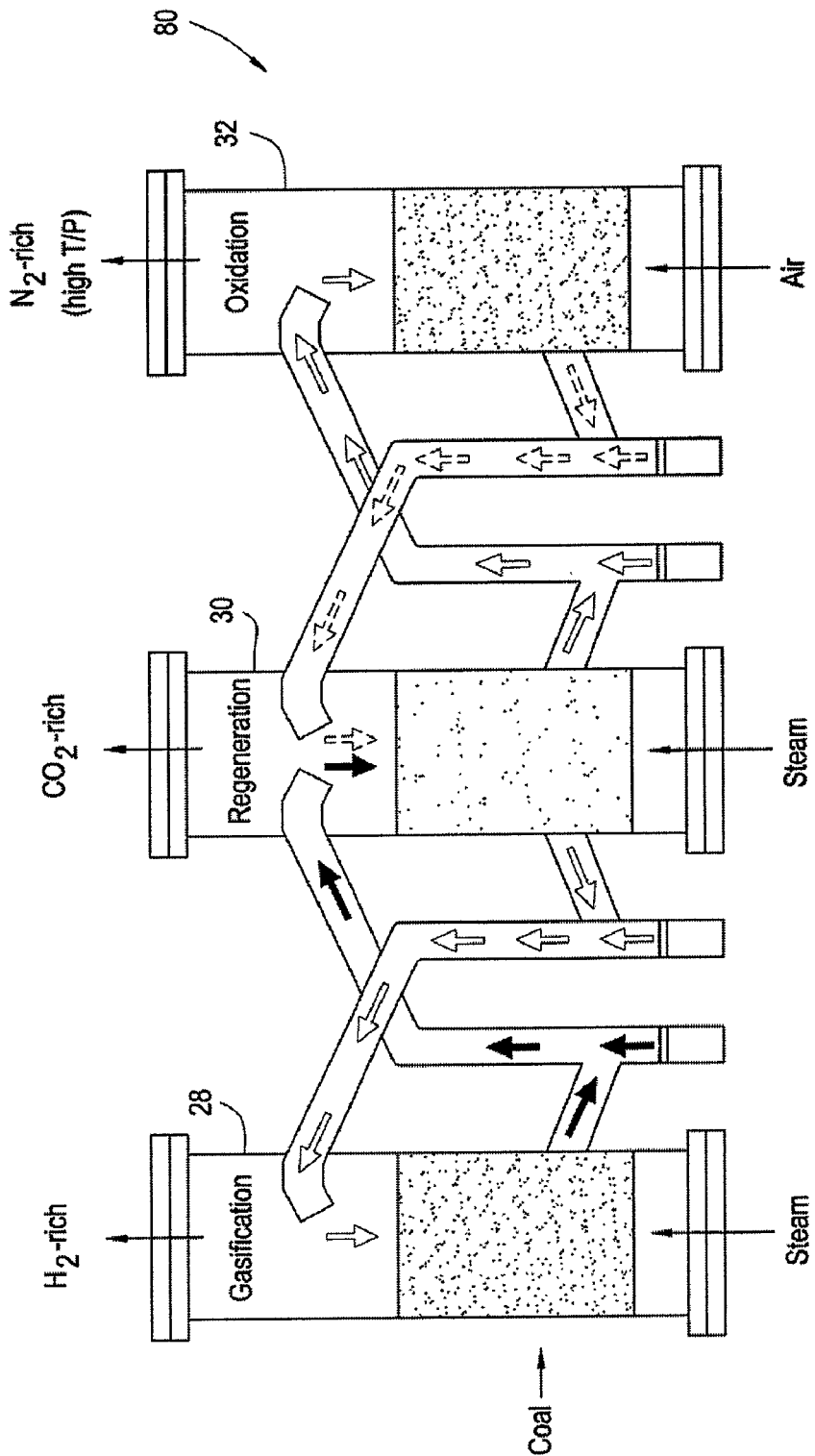
FIG. 1 is a cross-sectional schematic illustration of an exemplary embodiment of an unmixed fuel processor.

Referring now to the figures, wherein like elements in the several figures are numbered alike for convenience and clarity of the figures, but are not discussed in relation to each figure. FIG. 1 schematically illustrates an unmixed fuel processor 80 and the flows therein. In unmixed fuel processing technology, solid hydrocarbon fuel, water, and air are converted into separate streams of hydrogen-rich gas in a gasification reactor 28, $CO_2$-rich gas that can be sent for sequestration in a regeneration reactor 30, and oxygen-depleted (vitiated) air (at high temperature (e.g., about 1,100° C. to about 1,300° C.) and pressure (e.g., about 1 atmospheres (atm) to about 60 atm) that can be used to generate electricity, e.g., in a gas turbine expander. The UFP technology captures $CO_2$ at a high temperature (about 600° C. to about 1,200° C., or, more specifically, about 750° C. to about 1,100° C.) and high pressure (about 1 atmospheres (atm) to about 60 atm, or, more specifically, about 20 atm) using $CO_2$ sorbent. Further, as fuel and air are not mixed together and also because of the lower gas turbine inlet temperature (e.g., turbine inlet temperature of about 1,100° C. to about 1,300° C. versus temperatures of about 1,400° C. for other systems), the UFP process can produce lower amounts of pollutants such as NOx as compared to a non-UFP process.

The UFP technology concept generally uses three circulating fluidized bed reactors containing $CO_2$ sorbent and oxygen transfer material (OTM). $CO_2$ sorbent (e.g., compounds comprising elements calcium (Ca), magnesium (Mg), lithium (Li), silicon (Si), as well as combinations comprising at least one of the foregoing) is a sorbent that absorbs and/or adsorbs $CO_2$ to form $CO_2$ sorbent-$CO_2$. The OTM is a metal oxide (e.g., compounds comprising iron (Fe), nickel (Ni), copper (Cu), manganese (Mn), so forth, as well as combinations comprising at least one of the foregoing), which can be oxidized to form OTM-O. A mixture of the bed materials is present in each reactor, and the bed materials undergo a variety of transformations and reactions as they move from one reactor to another. Each reactor serves a different key purpose: gasification, $CO_2$ release, or oxidation.

The gasification reactor 28 initially gasifies solid hydrocarbon fuel; solid hydrocarbon fuel (e.g., pulverized coal) fed to this is partially gasified with water (e.g., superheated water) to produce $H_2$, CO, and $CO_2$. Conditions in the gasification reactor (e.g., a temperature of about 600° C. to about 900° C., or, more particularly, about 750° C. to about 850° C.; and a pressure of about 1 atm to about 60 atm, or, more particularly, about 15 atm to about 20 atm) facilitate $CO_2$ absorption by the $CO_2$ sorbent. The reduction in gas-phase $CO_2$ concentration shifts the equilibrium of the water-gas shift reaction to deplete CO from the gas phase ($CO+H_2O \rightarrow H_2+CO_2$). The removal of both CO and $CO_2$ in the gasification reactor 28 results in a $H_2$-rich product stream. The circulation of bed materials provides a continuous supply of fresh $CO_2$ sorbent from and transfers spent $CO_2$ sorbent to the regeneration reactor 30.

The regeneration reactor 30 is the location of $CO_2$ release from spent $CO_2$ sorbent ($CO_2$ sorbent-$CO_2$+heat$\rightarrow CO_2$ sorbent+$CO_2$), thereby regenerating the $CO_2$ sorbent. Regeneration occurs as the hot bed material (oxygen transfer material, e.g., at a temperature of about 1,100° C. to about 1,300° C.) transferred from the oxidation reactor 32 heats regeneration reactor 30, increasing the bed temperature to a sufficient level for $CO_2$ release; e.g., to a temperature of about 900° C. to about 1,100° C. (e.g., at a pressure of about 6 atm to about 8 atm). The $CO_2$ release generates a $CO_2$-rich product stream suitable for sequestration. In addition, the oxidized oxygen transfer material from oxidation reactor 32 is reduced by the syngas generated from gasification of char as it provides the oxygen needed to oxidize CO to $CO_2$ and $H_2$ to $H_2O$.

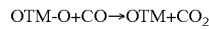

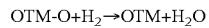

The reduced oxygen transfer material is oxidized in oxidation reactor 32:

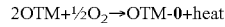

Hence, air fed to the oxidation reactor 32 re-oxidizes the oxygen transfer material via a highly exothermic reaction that consumes most of the oxygen in the air feed. Thus, the oxidation reactor 32 produces high-temperature (temperature of about 1,100° C. to about 1,300° C.), high-pressure (e.g., a pressure of greater than or equal to about 10 atm, or, more particularly, about 15 atm to about 20 atm) oxygen-depleted (vitiated) air for use in a gas turbine expander, as well as generating heat that is transferred to gasification reactor 28 and regeneration reactor 30, via solid transfer. Essentially, the regeneration reactor 30 exchanges bed materials with both gasification reactor 28 and oxidation reactor 32 with no direct gasification reactor-to-oxidation reactor transfer, thereby allowing for the regeneration and recirculation of both the $CO_2$ sorbent and the oxygen transfer material. $CO_2$ sorbent absorbs $CO_2$ in the gasification reactor 28 and releases it in regeneration reactor 30, while the oxygen transfer material is oxidized in oxidation reactor 32 and reduced in regeneration reactor 30.

Figure 2:
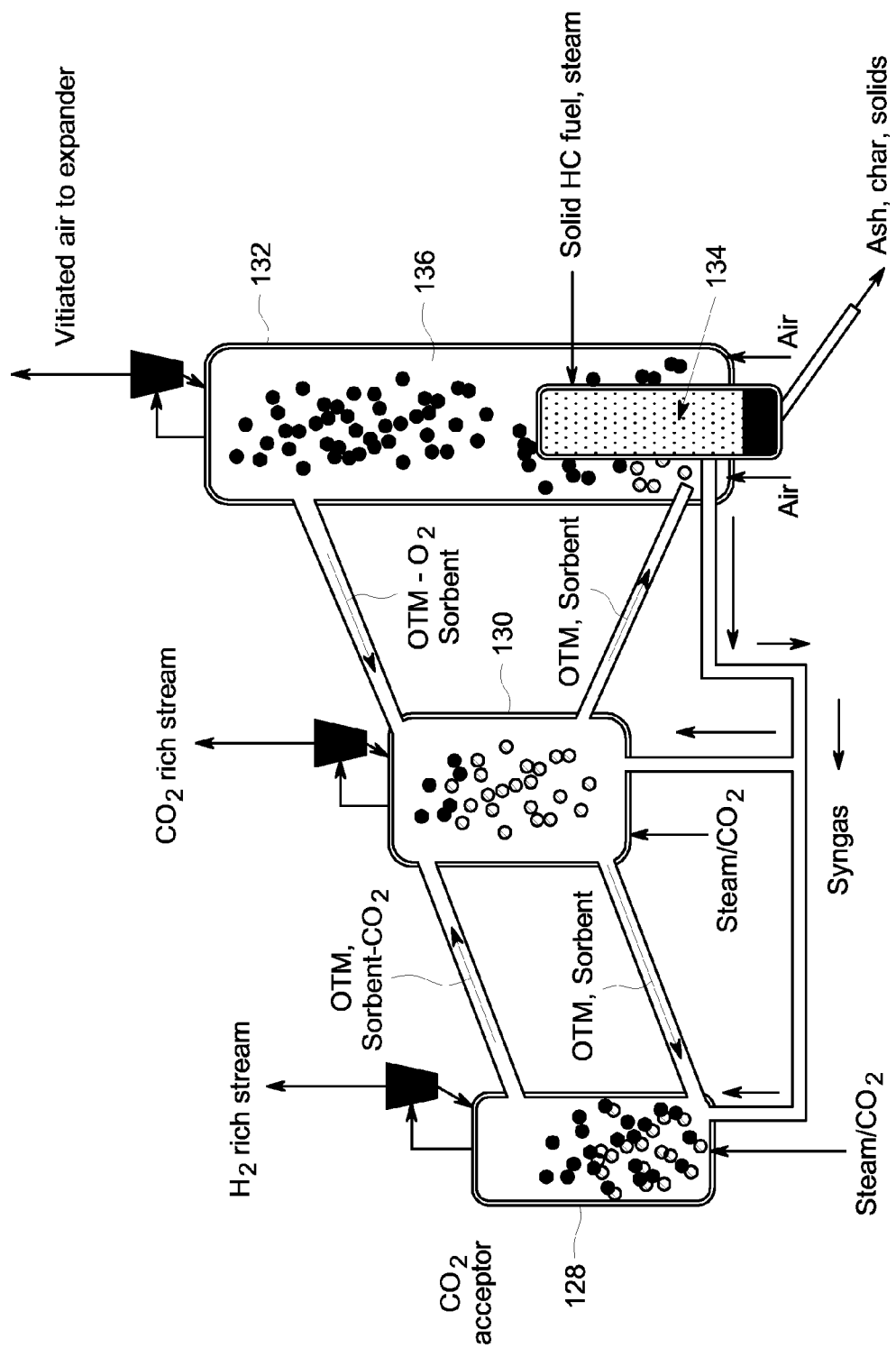
FIG. 2 is a cross-sectional, schematic illustration of another embodiment of an unmixed fuel processor.

FIG. 2, the solid hydrocarbon fuel (e.g., coal) is no longer introduced into the reactor that produces the hydrogen containing stream, $CO_2$ acceptor reactor 128, but is introduced to a vessel, a gasifier 134, extending into the oxidation reactor 132. In this processor, the solid hydrocarbon fuel (e.g. pulverized coal) is gasified with a reaction gas (such as water (e.g., superheated water), $CO_2$, $O_2$, and air, as well as combinations comprising at least one of the foregoing gases). Within this reactor, the hydrocarbon fuel reacts with the water and/or with the $CO_2$ to form a syngas (e.g., mainly hydrogen ($H_2$) and carbon monoxide (CO); such as about 30 volume percent (vol %) to about 40 vol % $H_2$, about 30 vol % to about 40 vol % CO, 20 vol % to about 30 vol % $CO_2$, about 5 vol % to about 10 vol % hydrocarbons (HC), and any impurities (e.g., less than or equal to about 1 vol % impurities)).

The oxidation reactor 132 can be fluidized with air such that the exothermic oxidation reaction in the oxidation reactor 132 provides the heat to the gasifier 134/234 for the reaction therein. Generally, the oxidation portion 136 of the reactor has a temperature of about 1,100° C. to about 1,300° C., or, more specifically, about 1,200° C. to about 1,300° C., while the temperature in the gasifier is about 700° C. to about 1,200° C.

When the hydrocarbon fuel reacts to form the syngas, the nonreactant solids (e.g., ash, char, and so forth), are separated from the syngas stream and collect at the bottom of the gasifier. As is discussed in greater detail below, the bottom portion of the gasifier can be at a lower temperature than the remainder of the gasifier to facilitate the accumulation of the solids therein. The solids can be removed from the gasifier, while the syngas can be directed to a $CO_2$ acceptor reactor, and optionally to the regeneration reactor 130.

From the gasifier, the syngas, along with water (e.g., superheated water) and optionally $CO_2$, are introduced to the $CO_2$ acceptor reactor 128. The $CO_2$ (e.g., recycled $CO_2$ from the regeneration reactor outlet) can be employed in the $CO_2$ acceptor reactor 128, the regeneration reactor 130, and/or gasifier 134, e.g., to further enable fluidization of the reactors with reduced amounts of water and/or to enable further syngas production. As with the gasification reactor 28, the $CO_2$ acceptor reactor 128 comprises a $CO_2$ sorbent such that $CO_2$ is adsorbed, changing the equilibrium for the water gas shift reaction, and causing CO to react and form $CO_2$; further purifying the hydrogen stream. Hence, a hydrogen stream exits from the $CO_2$ acceptor reactor 128. The spent $CO_2$ sorbent passes from the $CO_2$ acceptor reactor 128, as well as oxidized oxygen transfer material from the oxidation reactor 132, are reacted in the regeneration reactor 130 such that the oxidized oxygen transfer material is reduced, the spent $CO_2$ sorbent is regenerated, and a $CO_2$ rich stream is produced. Syngas from the gasifier 134 can also be introduced to the regeneration reactor 130 to facilitate in the reduction of the oxidized oxygen transfer material.

Figure 3:
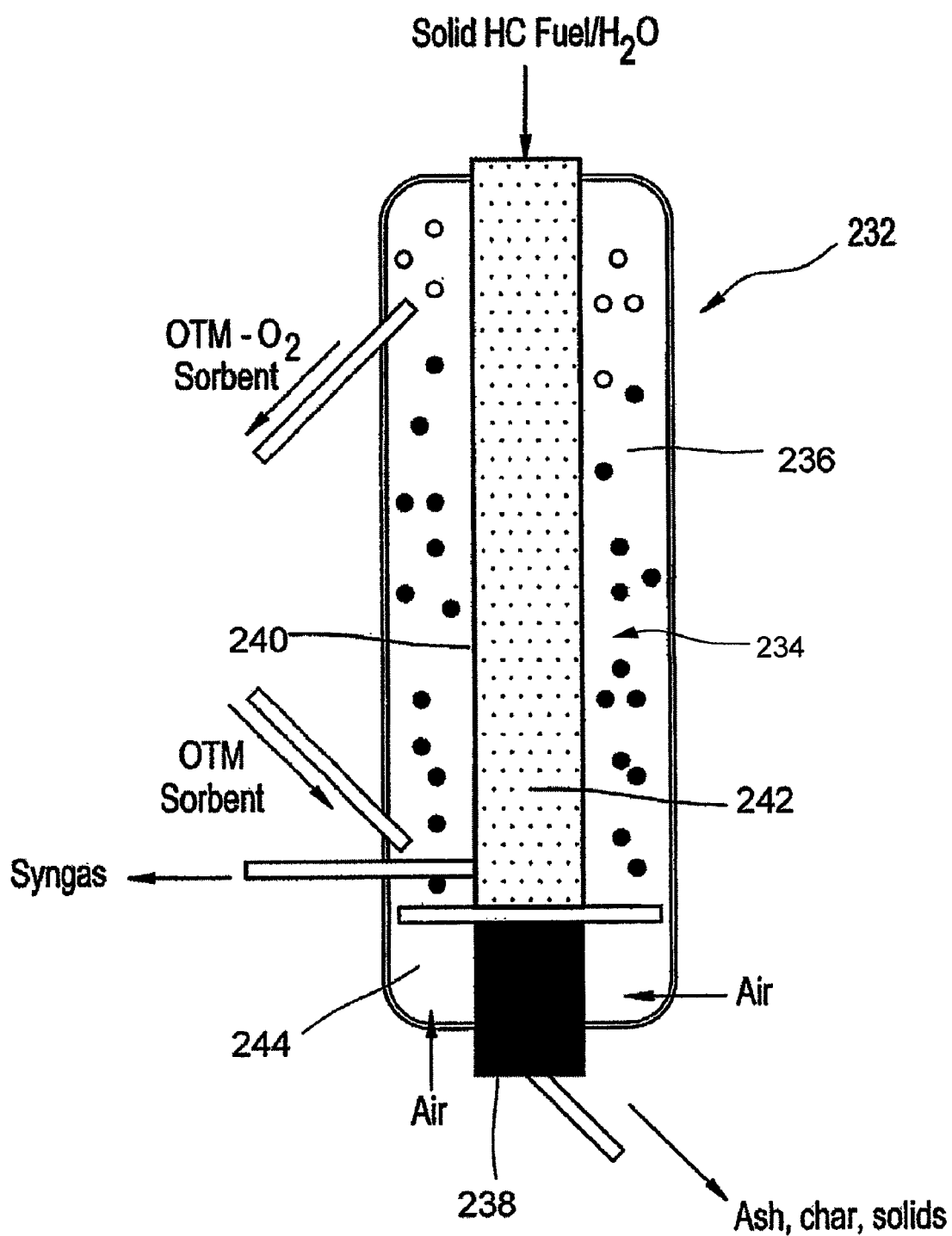
FIG. 3 is a cross-sectional, schematic illustration of an oxidation reactor for an unmixed fuel processor.

Another embodiment of the oxidation reactor is illustrated in FIG. 3. As can be seen, in this embodiment, the gasifier 234 extends the length of the oxidation reactor 232. As is evident, the gasifier 234 can be any size and will be designed based upon desired production rates. As can be seen in FIGS. 2 and 3, the solids congregate in the cool area of the oxidation reactor. In both cases, the solids congregate in an area separate from the oxidation reaction (e.g., the area comprising the oxidation material), while the gasification occurs in the gasifier 134/234, in the area adjacent to the oxidation reaction. The gasifier 134/234 desirably has a sufficiently large solids accumulation area 238 that has a sufficiently low temperature to enable the collection of the solids, while also allowing gasification of the hydrocarbon fuel (e.g., coal, biomass, and so forth) in a gasification area 240. The solids accumulation area 238 can have a temperature of less than or equal to about 700° C., or, more particularly, about room temperature (e.g., about 25° C.) to about 700° C., with a temperature gradient generally present (e.g., a decreasing temperature from the interface of the solid accumulation area 238 toward the opposite side of the solid accumulation area). Optionally, the oxidation reactor 132 can comprise a heat exchange area 244 around all or part of the solids accumulation area 238. For example, a heat exchange portion 244 through which the air passes prior to entering the oxidation portion in order to heat the air prior to the air contacting the oxygen transfer material, while cooling the solids. (See FIG. 3) Alternatively, or in addition, other heat exchange technology can be employed to cool the solids accumulation area (e.g., a coolant in thermal communication with the solids accumulation area, and the like). For example, the solids accumulation area can be disposed in a water bath.

In order to facilitate the conversion of the hydrocarbon fuel to syngas, a catalyst 242 can be disposed in the gasifier 134/234. The catalyst 242 can be any catalyst capable of facilitating the conversion of the hydrocarbon fuel and fluidization material (e.g., water and/or $CO_2$) to $H_2$ and CO. Possible catalysts include compounds containing iron (Fe), nickel (Ni), calcium (Ca), magnesium (Mg), as well as combinations comprising at least one of the foregoing, such as dolomite.

The UFP systems disclosed herein can be used in various power generation plants. The UFP system produces a $H_2$ rich stream from the $CO_2$ acceptor reactor (reactor 1), a $CO_2$ rich stream from the regeneration reactor, and a high temperature, high pressure oxygen depleted (e.g., nitrogen rich) stream from the oxidation reactor. The $CO_2$ stream can be sent for sequestration, the $H_2$ stream can be used in various $H_2$ processes (liquefaction, fuel cell power generation, material production processes (e.g., urea and/or ammonia), and so forth), and the oxygen depleted stream can be used in power generation such as in a gas turbine expander. This system can thus produce $H_2$ and electricity along with $CO_2$ capture from solid fuels containing carbon. Some possible plants in which these UFP systems can be employed are disclosed in U.S. patent application Ser. No. 11/609,109 to Kulkarni et al., filed concurrently herewith.

Compared to non-UFP systems, the UFP systems disclosed herein can eliminate the air separation unit and can replace low temperature $CO_2$ capture with high temperature, high pressure, $CO_2$ capture. In addition, the current UFP systems avoid the agglomeration of solids issues that face other UFP technologies. The avoidance of the agglomeration issue enables greater fuel flexibility since the process is independent of the percent ash and type of solid hydrocarbon fuel.

Ranges disclosed herein are inclusive and combinable (e.g., ranges of "up to about 25 wt %, or, more specifically, about 5 wt % to about 20 wt %", is inclusive of the endpoints and all intermediate values of the ranges of "about 5 wt % to about 25 wt %," etc.). "Combination" is inclusive of blends, mixtures, alloys, reaction products, and the like. Furthermore, the terms "first," "second," and the like, herein do not denote any order, quantity, or importance, but rather are used to distinguish one element from another, and the terms "a" and "an" herein do not denote a limitation of quantity, but rather denote the presence of at least one of the referenced item. The modifier "about" used in connection with a quantity is inclusive of the state value and has the meaning dictated by context, (e.g., includes the degree of error associated with measurement of the particular quantity). The suffix "(s)" as used herein is intended to include both the singular and the plural of the term that it modifies, thereby including one or more of that term (e.g., the colorant(s) includes one or more colorants). Reference throughout the specification to "one embodiment", "another embodiment", "an embodiment", and so forth, means that a particular element (e.g., feature, structure, and/or characteristic) described in connection with the embodiment is included in at least one embodiment described herein, and may or may not be present in other embodiments. In addition, it is to be understood that the described elements may be combined in any suitable manner in the various embodiments.

All cited patents, patent applications, and other references are incorporated herein by reference in their entirety. However, if a term in the present application contradicts or conflicts with a term in the incorporated reference, the term from the present application takes precedence over the conflicting term from the incorporated reference.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An unmixed fuel processor, comprising:
    an oxidation reactor comprising an oxidation portion and a gasifier, wherein the oxidation portion comprises an air inlet, effluent outlet, and an oxygen transfer material that undergoes an exothermic oxidation reaction with air introduced into the oxidation reactor through the air inlet to produce oxygen depleted gas at a high temperature and high pressure that exits the oxidation reactor through the effluent outlet, and wherein the gasifier comprises a solid hydrocarbon fuel inlet, a solids outlet, and a syngas outlet,
    a $CO_2$ acceptor reactor comprising a water inlet, a hydrogen outlet, and a $CO_2$ sorbent, wherein the $CO_2$ acceptor reactor is configured to receive syngas from the gasifier;
    a regeneration reactor comprising a water inlet and a $CO_2$ stream outlet, wherein the regeneration reactor is configured to receive spent $CO_2$ adsorption material from the $CO_2$ acceptor reactor and to return regenerated $CO_2$ adsorption material to the $CO_2$ acceptor reactor, and configured to receive oxidized oxygen transfer material from the oxidation reactor and to return reduced oxygen transfer material to the oxidation reactor.

2. The processor of claim 1, wherein the oxidation reactor is configured such that during operation of the processor, a solids accumulation area disposed adjacent the solids outlet is maintained at a temperature that enables solids to accumulate in the solids accumulation area, and to enable gasification and reaction of a solid hydrocarbon fuel in a gasification area.

3. The processor of claim 1, wherein the gasifier further comprises a catalyst.

4. The processor of claim 3, wherein the catalyst comprises a compound selected from the group consisting of iron, nickel, calcium, magnesium, and combinations comprising at least one of the foregoing.

5. The processor of claim 1, wherein the regeneration reactor is further configured to receive syngas from the gasifier.

6. The processor of claim 1, wherein the oxidation reactor is configured to allow heat exchange between air entering the oxidation portion and the gasifier.

7. The processor of claim 1, wherein the oxidation reactor further comprises a heat exchanger disposed in thermal communication with a solids accumulation area.

8. A method for operating an unmixed fuel processor, comprising:
    introducing a solid hydrocarbon fuel to a gasifier of an oxidation reactor, wherein the oxidation reactor comprises an oxidation portion, wherein the oxidation portion comprises an oxygen transfer material, and wherein the gasifier comprises a solids accumulation area and a solids outlet;
    oxidizing an oxygen transfer material in the oxidation portion and forming an oxygen depleted stream;
    gasifying the solid hydrocarbon fuel;
    reacting the solid hydrocarbon fuel to form syngas;
    removing solids from the syngas;
    introducing the syngas and water to a $CO_2$ acceptor reactor;
    adsorbing the $CO_2$ with a $CO_2$ sorbent to produce a spent $CO_2$ sorbent and form a $H_2$ stream; and
    regenerating the spent $CO_2$ sorbent and reducing the oxidized oxygen transfer material in a regeneration reactor and forming a $CO_2$ stream.

9. The method of claim 8, wherein the solid hydrocarbon fuel is reacted with a reaction gas to form the syngas, and wherein the reaction gas is selected from the group consisting of water, $CO_2$, and combinations comprising at least one of the foregoing gases.

10. The method of claim 8, further comprising introducing a portion of the syngas to the regeneration reactor.

11. The method of claim 8, wherein the solids accumulation area has an average temperature of less than or equal to about 700° C., and the remainder of the gasifier has an average temperature of about 700° C. to about 1,200° C.

12. The method of claim 8, further comprising directing the oxygen depleted stream to a turbine.

13. The method of claim 8, further comprising recycling at least a portion of the $CO_2$ stream to a UFP component selected from the group consisting of the $CO_2$ acceptor reactor, the regeneration reactor, the gasifier, and combinations comprising at least one of the foregoing UFP components.

14. The method of claim 8, further comprising cooling a solids accumulation area of the gasifier.

15. The method of claim 14, further comprising introducing air to the oxidation portion, wherein the air is heated with heat from the gasifier prior to entering the oxidation portion.

16. The processor of claim 1, wherein at least a portion of the gasifier is disposed relative to the oxidation portion of the oxidation such that the exothermic oxidation of the oxidation transfer material provides energy for gasification of a solid hydrocarbon fuel within a gasifier area of the gasifier.

* * * * *